US008064189B2

(12) United States Patent
Masuda et al.

(10) Patent No.: US 8,064,189 B2
(45) Date of Patent: Nov. 22, 2011

(54) CAPACITOR STRUCTURE TO ENHANCE CAPACITIVE DENSITY AND REDUCE EQUIVALENT SERIES INDUCTANCE

(75) Inventors: Hidetoshi Masuda, Takasaki (JP); Kenji Kawano, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 662 days.

(21) Appl. No.: 12/139,444

(22) Filed: Jun. 13, 2008

(65) Prior Publication Data

US 2009/0154054 A1    Jun. 18, 2009

(30) Foreign Application Priority Data

Jun. 14, 2007   (JP) .................................. 2007-158084
Apr. 23, 2008   (JP) .................................. 2008-113256

(51) Int. Cl.
*H01G 4/005* (2006.01)
*H01G 4/236* (2006.01)
*H01G 4/228* (2006.01)

(52) U.S. Cl. ....................... 361/303; 361/307; 361/306.1

(58) Field of Classification Search .................. 361/311, 361/303, 306, 307, 308
See application file for complete search history.

(56) References Cited

U.S. PATENT DOCUMENTS

2004/0174655 A1* 9/2004 Tsai et al. .................. 361/306.3

FOREIGN PATENT DOCUMENTS

| JP | H09-045577 A1 | 2/1997 |
| JP | 2006-512787 A1 | 4/2006 |
| WO | 2004-075218 A1 | 9/2004 |

OTHER PUBLICATIONS

Hideki Masuda, "Formation and Functionality Highly Regulated Alumina Nanohole Arrays By Self-organization Process", Applies Physic vol. 72. No. 10 (2003). pp. 1280-1285.

* cited by examiner

*Primary Examiner* — Jayprakash N Gandhi
*Assistant Examiner* — Arun Ramaswamy
(74) *Attorney, Agent, or Firm* — Law Office of Katsuhiro Arai

(57) ABSTRACT

A capacitor includes a dielectric material that is formed of anodic metal oxide; a pair of substantially comb-shaped surface electrodes formed on the same principal surface of the dielectric material; and plural substantially columnar internal electrodes whose one ends are connected to the respective comb-shaped portions of the pair of the surface electrodes and whose other ends extend in the thickness direction of the dielectric material.

7 Claims, 3 Drawing Sheets

[Fig. 1]
(A)
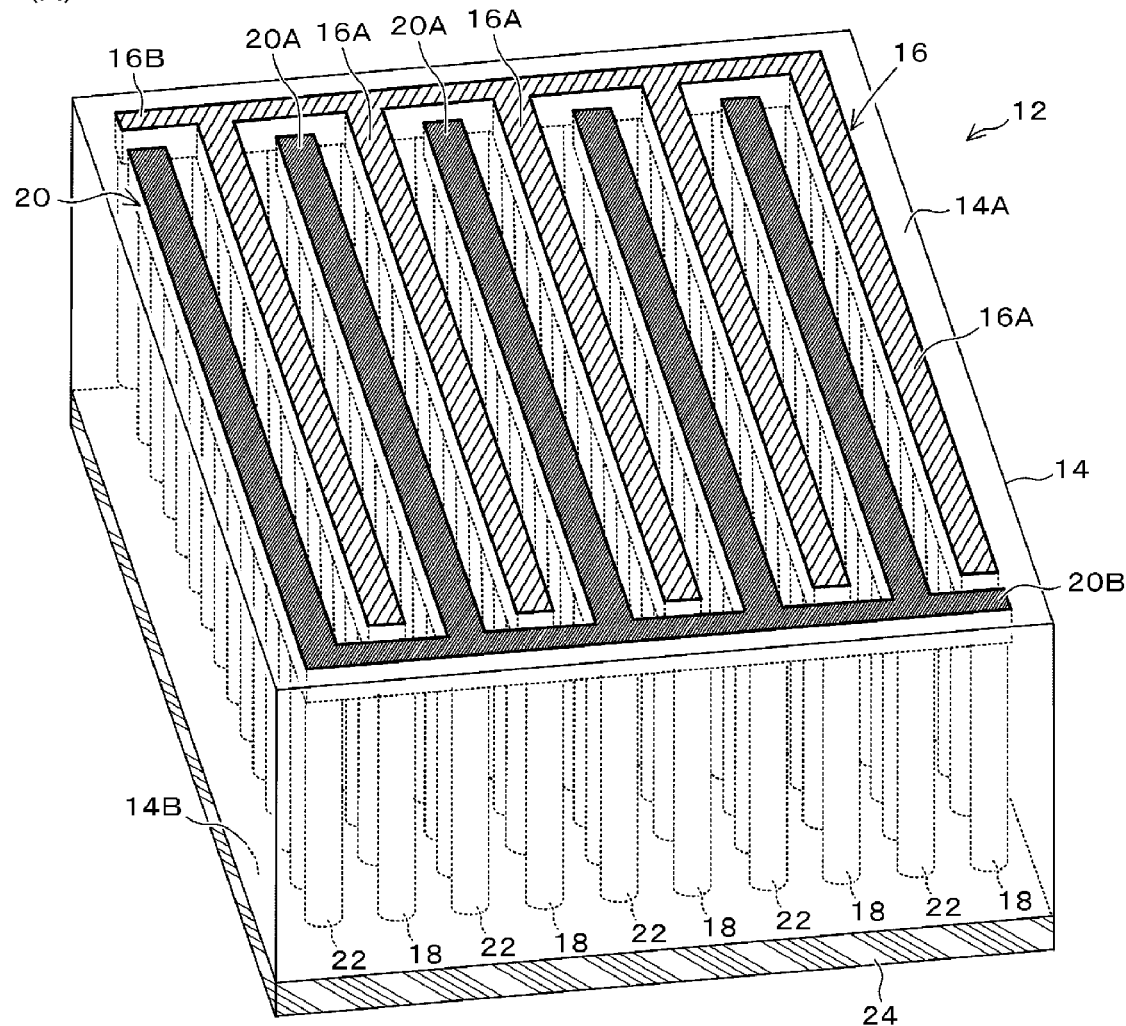
(B)
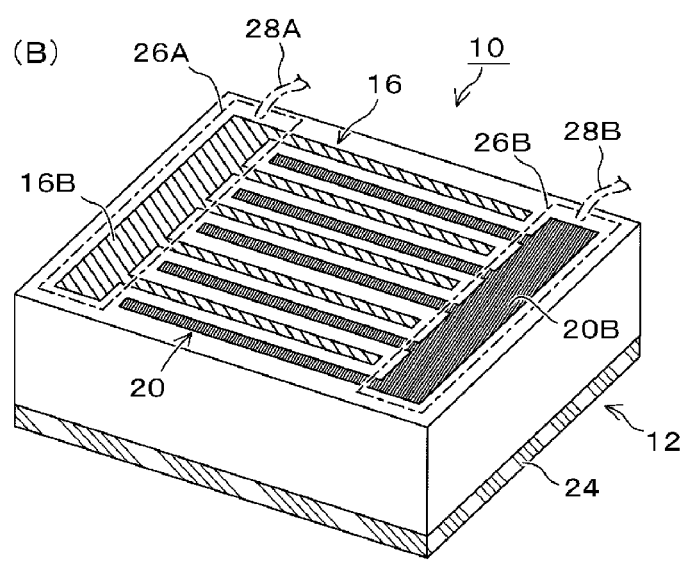

[Fig. 2]
(A)
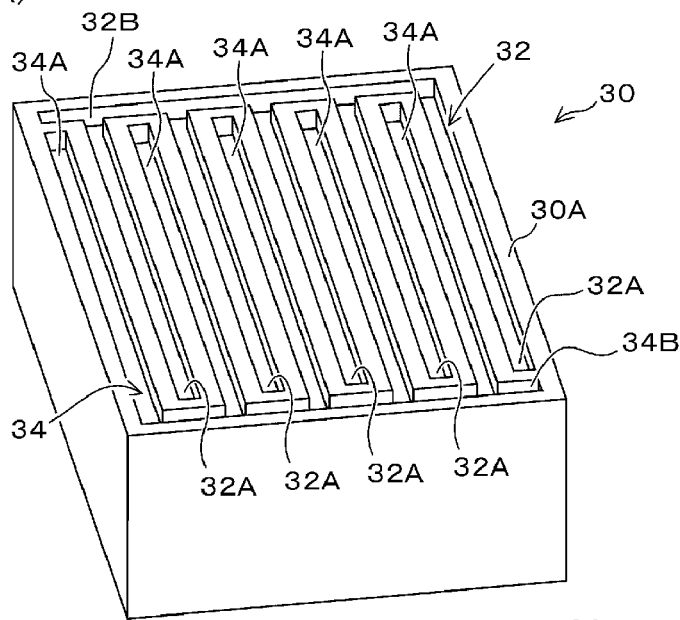
(B)
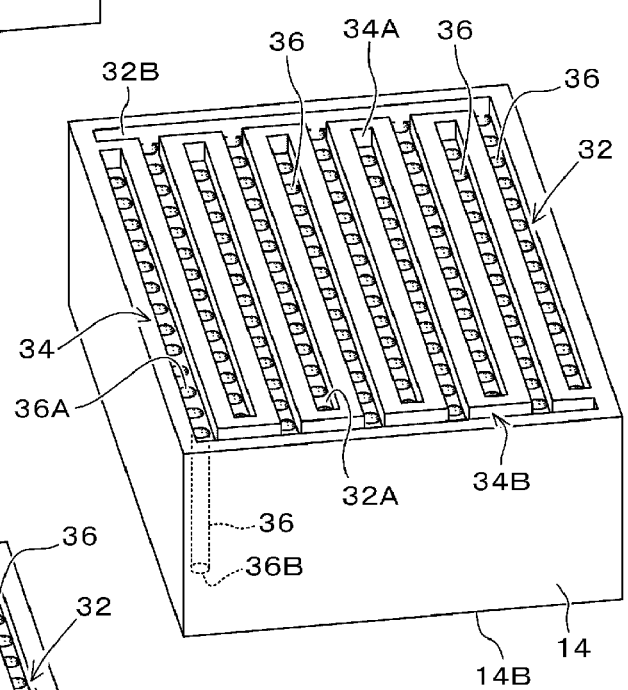
(C)
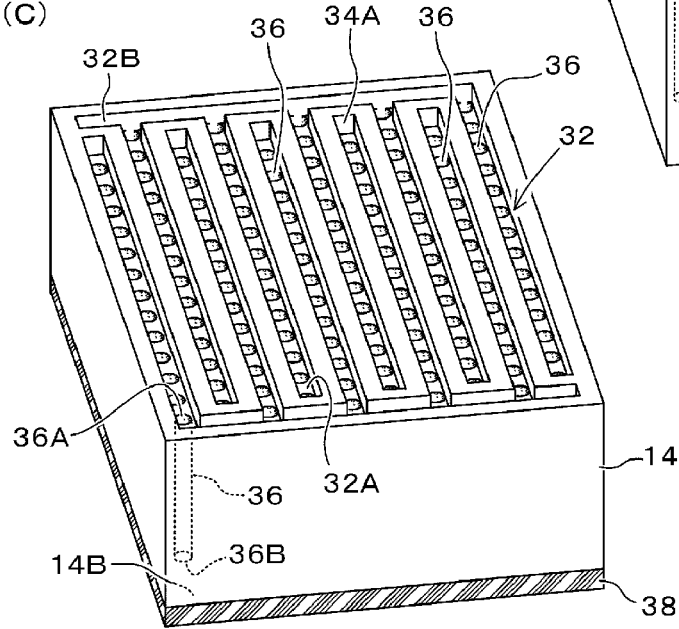

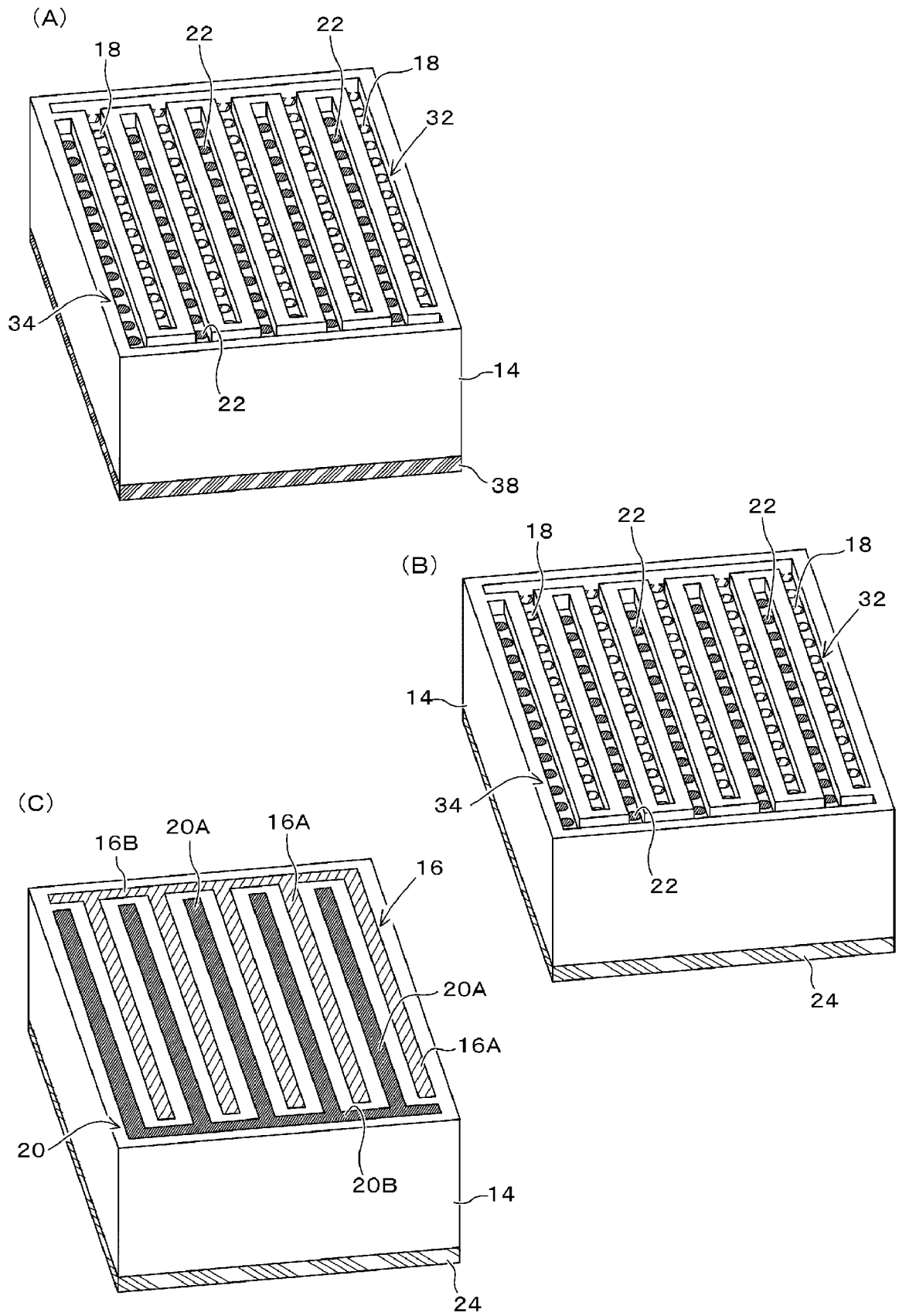
[Fig. 3]

CAPACITOR STRUCTURE TO ENHANCE CAPACITIVE DENSITY AND REDUCE EQUIVALENT SERIES INDUCTANCE

BACKGROUND OF THE INVENTION

1. Field of the Invention

The present invention relates to a capacitor and a method of manufacturing the same, and particularly to enhancement of capacity density, simplification of a manufacturing process and reduction of ESL (Equivalent Series Inductance).

2. Description of the Related Art

Al electrolytic capacitors and laminated ceramic capacitors are known as capacitors which are broadly used at present. The Al electrolytic capacitors have a problem that liquid leak, etc. occurs due to use of electrolytic liquid, etc. Furthermore, the laminated ceramic capacitors require a burning step, and thus it induces thermal shrinkage between an electrode and a dielectric member, etc. For example, as a technique of implementing a compact and large-capacitance capacitor is known a method of manufacturing laminated electrical parts shown in JP-A-9-45577, and a capacitor and a method of manufacturing the same disclosed in JP-T-2006-512787, for example.

JP-A-9-45577 discloses a method of manufacturing laminated electrical parts having a structure that plural internal electrodes are disposed so as to confront one another through a ceramic layer. Specifically, this method comprises a step of forming metal film on a substrate, trimming the metal film by photolithography to form a predetermined electrode pattern serving as an internal electrode, and a step of forming ceramic material serving as a functional element portion in a pore portion of the electrode pattern by a dry plating method. Furthermore, JP-T-2006-512787 discloses the following capacitor. Specifically, the capacitor comprises a first electrode that is formed in a semiconductor substrate, contains a first via and a metal layer connected to the first via and is electrically connected to a first area of the semiconductor substrate, a second electrode that is formed in the semiconductor substrate, contains a second via and a metal layer connected to the second via and is electrically connected to a second area of the semiconductor substrate, and a dielectric material having a high dielectric constant disposed between the first electrode and the second electrode.

However, the background art described above has the following problems. First, in the technique disclosed in JP-A-9-45577, the electrode is formed by etching the metal film formed on the substrate. Therefore, it is difficult to increase the aspect ratio in the z direction (thickness direction). Furthermore, in the technique disclosed in JP-T-2006-512787, it is also difficult to increase the aspect ratio in the z direction because the electrode is also formed by etching. As described above, in the electrode forming technique using etching, it is difficult to increase the aspect ratio in the z direction of the electrode portion in order to increase the area defining the capacitance.

SUMMARY OF THE INVENTION

Therefore, an object of at least one of the disclosed embodiments of the present invention is to provide a capacitor and a capacitor manufacturing method that can enhance capacitance density although it is compact, and a method of manufacturing the capacitor. Furthermore, at least one of the disclosed embodiments of the present invention has another object to provide a capacitor and a capacitor manufacturing method that can simplify a manufacturing process and reduce ESL.

In order to attain the above aspect, according to a first aspect of the present invention, there is provided a capacitor comprising: a dielectric material that is formed of anodic metal oxide and has a predetermined thickness; a pair of substantially comb-shaped surface electrodes that is formed on the same principal surface of the dielectric material and in which one end sides of plural comb-shaped portions are connected to a base portion; and substantially columnar (pillar-shaped) plural internal electrodes whose one ends are connected to the respective comb-shaped portions of the pair of the surface electrodes and whose other ends extend in the thickness direction of the dielectric material, wherein the pair of surface electrodes are disposed on the surface of the dielectric material so that the respective comb-shaped portions thereof are arranged alternately and in parallel through the dielectric material. The other ends of the internal electrodes may be exposed to the principal surface of the dielectric material which confronts the surface on which the surface electrodes are formed, and an insulating layer may be provided on the principal surface of the dielectric material.

In the capacitor according to an embodiment of the present invention, the pair of substantially comb-shaped surface electrodes are formed on the surface of the dielectric material that is formed of anodic metal oxide and has a predetermined thickness so that the comb-shaped portions thereof are arranged alternately and in parallel so as to be spaced from one another at predetermined intervals. In addition, the capacitor is provided with the plural substantially columnar (pillar-shaped) internal electrodes whose one ends are connected to the comb-shaped portions and whose other ends extend in the thickness direction of the dielectric material. Therefore, the area which determines the capacitance of the capacitor can be increased and thus the capacitance can be increased.

Furthermore, with respect to the respective internal electrodes connected to the different surface electrodes, the current directions thereof are opposite to each other, and thus the effect of offsetting magnetic field is enhanced, and thus ESL can be reduced.

According to a second aspect of the present invention, there is provided a capacitor manufacturing method comprising: a first step of forming a pair of substantially comb-shaped recess patterns on a principal surface of a metal base material having a predetermined thickness, each of the comb-shaped recess patterns having plural comb-shaped portions and a base portion to which one end sides of the comb-shaped portions are connected, and the comb-shaped recess patterns being arranged alternately and in parallel through the metal base material; a second step of anodically oxidizing the metal base material to form a dielectric material having plural pores extending from the comb-shaped portions of the recess patterns in the thickness direction of the metal base material; a third step of opening the end portions of the pores formed in the dielectric material at the principal surface of the dielectric material, and forming a seed layer covering the openings concerned at the principal surface of the dielectric material; a fourth step of forming a substantially or nearly columnar (pillar-shaped) internal electrodes by using the seed layer and embedding electrical conductors in the pores; and a fifth step of removing the seed layer, and providing electrical conductors in the pair of recess patterns to form a pair of substantially comb-shaped surface electrodes so that the plural internal electrodes arranged along the comb-shaped portions of the respective recess patterns are electrically conducted to one another.

According to one or more of the disclosed embodiments of this invention, the manufacturing process of filling electrode materials into pores after the pores are formed in the dielectric material can be simplified.

The above method may further comprise a sixth step of coating an insulating material on the principal surface that is exposed after the seed layer is removed in the fifth step.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

FIG. 1A is a perspective view showing an electrode structure of a capacitor element according to a first embodiment.

FIG. 1B is a perspective view showing the outlook of the capacitor according to the first embodiment.

FIGS. 2A to 2C are diagrams showing an example of a manufacturing process of the first embodiment.

FIGS. 3A to 3C are diagrams showing an example of the manufacturing process of the first embodiment.

DETAILED DESCRIPTION OF THE PREFERRED EMBODIMENT

A preferred embodiment according to the present invention will be described hereunder with reference to the accompanying drawings. However, the preferred embodiment is not intended to limit the present invention. In the present disclosure where conditions and/or structures are not specified, the skilled artisan in the art can readily provide such conditions and/or structures, in view of the present disclosure, as a matter of routine experimentation.

First, a first embodiment according to the present invention will be described with reference to FIGS. 1 to 3.

FIG. 1A is a perspective view showing the electrode construction of a capacitor element according to this embodiment, and FIG. 1B is a perspective view showing the outlook of the capacitor according to this embodiment. FIGS. 2 and 3 are diagrams showing examples of the manufacturing process of this embodiment.

As shown in FIG. 1, the capacitor 10 of this embodiment is mainly constructed by a capacitor element 12 having a rectangular parallelepiped shape. The capacitor element 12 is constructed by a dielectric material 14 having a predetermined thickness, a pair of substantially comb-shaped (interdigital type) surface electrodes 16, 20 formed on the surface 14A of the dielectric material 14, and plural substantially or nearly columnar (pillar-shaped) internal electrodes 18, 22 extending from the surface electrodes 16, to the back surface 14B of the dielectric material 14. An insulating layer 24 is provided to the back surface 14B of the dielectric material as occasion demands.

The dielectric material 14 is formed by anodizing a metal base material, and the internal electrodes 18, 22 are formed by filling electrode material in holes 36 formed in the thickness direction of the dielectric material 14 (see FIG. 2C). The internal electrodes 18, 22 as described above have a large slenderness ratio (that is, a high aspect ratio in the z direction) and thus the area for determining the capacitance can be increased. Furthermore, in the surface electrode 16, one end sides of plural line-shaped comb-shaped portions 16A arranged substantially in parallel are connected to a base portion 16B which is substantially or nearly orthogonal to the comb-shaped portions 16A. With respect to the other surface electrode 20, one end sides of the plural comb-shaped portions (comb-teeth-like portions) 20A are connected to a base portion 20B. These surface electrodes 16, 20 are formed on the surface 14A of the dielectric material so that the respective comb-shaped portions 16A, 20A are alternately arranged at predetermined intervals through the dielectric material 14. The capacitor element 12 having the structure as described above is connected to lead wires 28A, 28B, etc. through electrical conductive patterns 26A, 26B connected to the base portions 16B, 20B of the surface electrodes 16, 20 as shown in FIG. 1B, and led out to the outside. The base portions 16B, 20B are actually formed to have a large width as shown in FIG. 1B for lead-out.

Oxide of valve metal (for example, Al, Ta, Nb, Ti, Zr, Hf, Zn, W, Sb or the like) is used for the dielectric material 14, and general metal (for example, Cu, Ni, Cr, Ag, Au, Pd, Fe, Sn, Pb, Pt, Ir, Rh, Ru, Al or the like) is used for the surface electrodes 16 and 20. Furthermore, the metal as described above is generally used for the internal electrodes 18, 22, and particularly metal which can be plated (for example, Cu, Ni, Co, Cr, Ag, Au, Pd, Fe, Sn, Pb, Pt or the like) or alloy thereof is used. Furthermore, oxide of the valve metal described above, $SiO_2$, SiN, resin, metal oxide or the like is used for the insulating layer 24. General metal is used for the electrical conductive patterns 26A, 26B as in the case of the surface electrodes 16, 20 described above.

Furthermore, with respect to the comb-shaped portions 16A, 20A of the surface electrodes 16, 20, the width is set to several tens nm to several hundreds nm (or on the order of $10^{-8}$ m to $10^{-7}$ m), the thickness is set to several tens nm to several hundreds nm (or on the order of $10^{-8}$ m to $10^{-7}$ m) and the interval is set to several tens nm to several hundreds nm (or on the order of $10^{-8}$ m to $10^{-7}$ m) with respect to the internal electrodes 18, 20, the diameter is set to several tens nm to several hundreds nm (or on the order of $10^{-8}$ m to $10^{-7}$ m), the length is set to several µm to several hundreds µm (or on the order of $10^{-6}$ m to $10^{-4}$ m) and the interval is set to several tens nm to several hundreds nm (or on the order of $10^{-8}$ m to $10^{-7}$ m). Furthermore, the thickness of the dielectric material 14 is set to several µm to several hundreds µm (or on the order of $10^{-6}$ m to $10^{-4}$ m), and the thickness of the insulating layer 24 is set to about several tens nm to several tens µm (or on the order of $10^{-8}$ m to $10^{-5}$ m).

Next, a manufacturing method according to this embodiment will be described with reference to FIGS. 2 and 3. First, A base material 30 formed of valve metal such as Al, Ta, Nb, Ti, Zr, Hf, Zn, Hf, Zn, W, Sb or the like is prepared, and a pair of substantially or nearly comb-shaped recess patterns 32, 34 are formed on the surface 30A of the base material 30 as shown in FIG. 2A. The recess patterns 32, 34 are equipped with base portions 32B, 34B disposed substantially or nearly in parallel to each other in the neighborhood of a pair of edge portions confronting to the surface 30A of the base material, and plural comb-shaped portions 32A, 34A whose one ends are connected to the base portions 32B, 34B. These comb-shaped portions (comb-teeth-like portions) 32A, 34A are substantially or nearly orthogonal to the base portions 32B, 34B, and further formed so as to be alternately arranged at a predetermined interval. The recess patterns 32, 34 are formed at a depth of about several tens nm to several hundreds nm by etching using lithography or in-print.

When the base material 30 on which the recess patterns 32, 34 as described above are formed is subjected to anodic oxidation processing (anodized) under a proper condition (e.g., using an acidic electrolyte), thereby forming and growing holes, there is obtained a dielectric material 14 having plural pores 36 (also referred to as "nanoholes") having a high aspect ratio along the substantially or nearly comb-shaped portions 32A and 34A as shown in FIG. 2B. The base material 30 is converted substantially or nearly to the dielectric material 14 while forming and growing holes as a result of erosion and anodic oxidation. The method of forming the pores 36 as described above is well known (e.g., Hideki Masuda, "Formation and Functionality of Highly Regulated Alumina Nanohole Arrays by Self-organization Process", Applied Physic Vol. 72, No. 10 (2003), pp 1280-1285, the disclosure of which is herein incorporated by reference for the purposes of providing methods for forming holes). Hole arrays having a diameter of about 30 nm and a pitch of about 100 nm can be obtained at about 40 V (oxalic acid), for example. Applied voltage and diameter and pitch are correlated at 1 nm/V for diameter and at 2.5 nm/V for pitch.

When aluminum is used as the base material 30, both erosion and anodic oxidation progress, thereby forming holes constituted by the dielectric material (anodic oxide material) 14 which is $Al_2O_3$. Subsequently, the lower end portions 36B of the pores 36 are opened at the back surface 14B side of the dielectric material, and also as shown in FIG. 2C, a seed layer 38 formed of electrical conductor is formed on the back surface 14B of the dielectric material by a proper method such as PVD or the like. The upper end portions 36A opens to the recess portions 32 and 34. The metal base material may be directly used for the seed layer 38, or after the base material is removed, film of another material may be formed.

Subsequently, as shown in FIG. 3A, the pores 36 is filled with plating metal material by using the seed layer 38 as a seed, thereby forming the substantially or nearly columnar (pillar-shaped) internal electrodes 18, 22 in the plural pores 36. With respect to these internal electrodes 18, 22, the lower ends thereof are connected to the seed layer 38, and the upper ends thereof are exposed to the bottom surfaces of the recessed comb-shaped portions 32A, 34A. Thereafter, as shown in FIG. 3B, the seed layer 38 is removed, and the insulating layer 24 is formed on the back surface 14B of the dielectric material as occasion demands. Finally, electrical conductive material is provided in the recess patterns 32, 34 to electrically conduct the plural comb-shaped portions 16A to one another and also electrically conduct the plural comb-shaped portions 20A to one another, thereby forming the pair of substantially or nearly comb-shaped surface electrodes 16, 20. Accordingly, the internal electrodes 18, 22 connected to the surface electrodes 16, 20 are also allocated to a positive electrode and a negative electrode.

As described above, according to the first embodiment, the pair of substantially or nearly comb-shaped surface electrodes 16, 20 are formed on the surface 14A of the dielectric material 14 which is formed of anodic metal oxide and has a predetermined thickness so that the comb-teeth-like portions 16A, 20A are alternately arranged through the dielectric material 14, and also the substantially or nearly columnar (pillar-shaped) internal electrodes 18, 22 extending from the comb-shaped portions 16A, 20A in the thickness direction of the dielectric material 14 is provided, whereby the following effects can be obtained.

(1) The internal electrodes 18, 22 having a high aspect ratio (e.g., 1 to $10^4$, preferably no less than 10, more no less than $10^2$) are formed, so that the area for determining the capacitance can be increased and thus the capacity of the capacitor 10 can be increased.

(2) The process of forming the dielectric material 14 having the plural substantially or nearly columnar (pillar-shaped) pores 36 and then filling the electrode material in the pores 36 can be simplified. Furthermore, the degree of freedom of the electrode material is increased.

(3) The surface electrodes 16, 20 are formed to be near to each other on the same plane (the surface 14A of the base material) so that the current directions thereof are opposite to each other, so that the effect of offsetting magnetic field can be enhanced and ESL can be greatly reduced.

The present invention is not limited to the above embodiment, and various modifications may be made without departing from the subject matters of the disclosed aspects and embodiments of the present invention. For example, the following modifications may be made.

(1) in the above embodiment, the shape and dimensions of the parts are examples, and the skilled artisan in the art can readily change them as occasion demands, based on the present disclosure. Furthermore, the number of the comb-shaped portions (tooth portions) 16A, 20A (e.g., $10^3$ to 1 tooth portions per 1 mm in length of the base portion) of the surface electrodes 16, 20 and the number of the internal electrodes 18, 22 (e.g., $10^6$ to $10^{10}$ internal electrodes per 1 mm in length of each tooth portion) are examples, and they may be properly changed as occasion demands. Two or more pairs of surface electrodes 16, 20 may be provided on the same principal surface.

(2) With respect to the materials, various kinds of materials may be used along the subject matters of the disclosed aspects and embodiments of the present invention. For example, aluminum is used as the metal base material forming the dielectric material 14 in the above embodiment, however, this is merely an example. Any suitable kind of metal may be applied insofar as the metal can be anodized.

(3) The electrode lead-out structure shown in the above embodiment is merely an example, and thus the skilled artisan in the art can readily change the design thereof so as to obtain the same or similar effect, based on the present disclosure.

(4) The manufacturing process of the above embodiment is merely an example, and the skilled artisan in the art can readily change it so as to obtain the same or similar effect, based on the present disclosure. For example, in the above embodiment, the surface electrodes 16, 20 are formed after the seed layer 38 is removed, however, this is merely an example. The seed layer 38 may be removed after the surface electrodes 16, 20 are formed.

According to at least one of the disclosed embodiment of this invention, the pair of substantially or nearly comb-shaped surface electrodes are formed on the surface of the dielectric material of metal anodic oxide having a predetermined thickness so that the comb-shaped portions are alternately arranged through the dielectric material, and also the plural substantially or nearly columnar (pillar-shaped) internal electrodes extending from the comb-shaped portions in the thickness direction of the dielectric material are provided, so that at least one of the disclosed embodiments of the present invention may be applied to a capacitor.

The present application claims priority to Japanese Patent Application No. 2007-158084, filed Jun. 14, 2007, and No. 2008-113256, filed Apr. 23, 2008, the disclosure of which is incorporated herein by reference in their entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A capacitor comprising:
a dielectric material that is formed of anodic metal oxide and has a determinable thickness;
a pair of substantially or nearly comb-shaped surface electrodes that is formed on the same principal surface of the dielectric material, each surface electrode comprising a base portion and plural tooth portions connected to the base portion; and
plural substantially or nearly columnar internal electrodes whose one ends are connected to each tooth portion of the pair of surface electrodes, said internal electrodes extending in the thickness direction of the dielectric material and being enclosed by a part of the dielectric material including their other ends opposite to the one ends in their entirety except the one ends, wherein the pair of surface electrodes are disposed on the surface of the dielectric material so that the respective tooth portions thereof are arranged alternately and in parallel through the dielectric material.

2. The capacitor according to claim 1, wherein the other ends of the internal electrodes are exposed to another principal surface of the dielectric material which is opposite to the surface on which the surface electrodes are formed, and an insulating layer is provided on the other principal surface of the dielectric material.

3. A capacitor comprising:
a dielectric material that is formed of anodic metal oxide and has a determinable thickness, said dielectric material having a pair of substantially or nearly comb-shaped recess patterns on a first principal surface and plural nanoholes extending solely through the dielectric material from the recess patterns in a thickness direction of the dielectric material, each comb-shaped recess pattern being constituted by a base portion and plural tooth portions extending from the base portion, wherein the tooth portions of the pair of comb-shaped recess patterns interlock without touching each other;
a pair of substantially or nearly comb-shaped surface electrodes that is formed in and along the comb-shaped recess patterns on the first principal surface of the dielectric material, said surface electrodes being insulated from each other; and
plural substantially or nearly columnar internal electrodes filling the nanoholes, wherein one ends of the internal electrodes are connected to each tooth portion of the pair of surface electrodes and the internal electrodes extend in the thickness direction of the dielectric material and are enclosed by a part of the dielectric material including their other ends opposite to the one ends in their entirety except the one ends.

4. The capacitor according to claim 3, wherein the other ends of the internal electrodes are exposed to a second principal surface of the dielectric material which is opposite to the first principal surface on which the surface electrodes are formed, and an insulating layer is provided on the second principal surface of the dielectric material.

5. The capacitor according to claim 1, wherein the internal electrodes have an aspect ratio of 10 to $10^4$.

6. The capacitor according to claim 1, wherein the number of the tooth portions is $10^3$ to $10^5$ per 1 mm in length of the base portion.

7. The capacitor according to claim 1, wherein the number of the internal electrodes is $10^6$ to $10^{10}$ per 1 mm in length of each tooth portion.

* * * * *